April 18, 1967  B. G. PERSSON  3,314,672
RESILIENT SUPPORT FOR SEATS, ESPECIALLY FOR MOTOR VEHICLES
Filed May 10, 1965  4 Sheets-Sheet 4
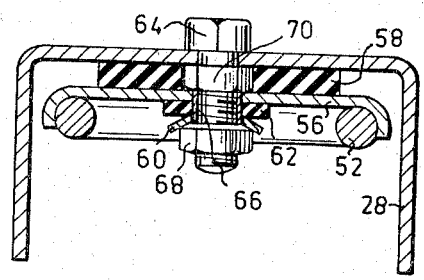
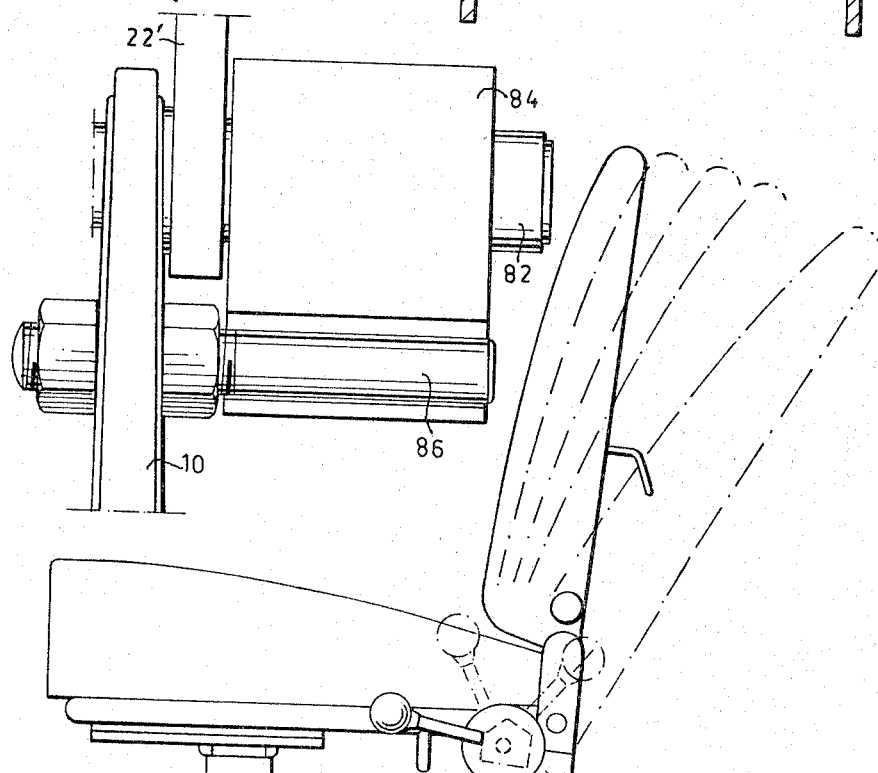
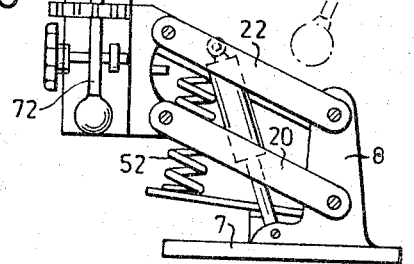
INVENTOR.
Bror Göte Persson
BY
Pierce, Scheffler & Parker
attorneys ular acceleration...

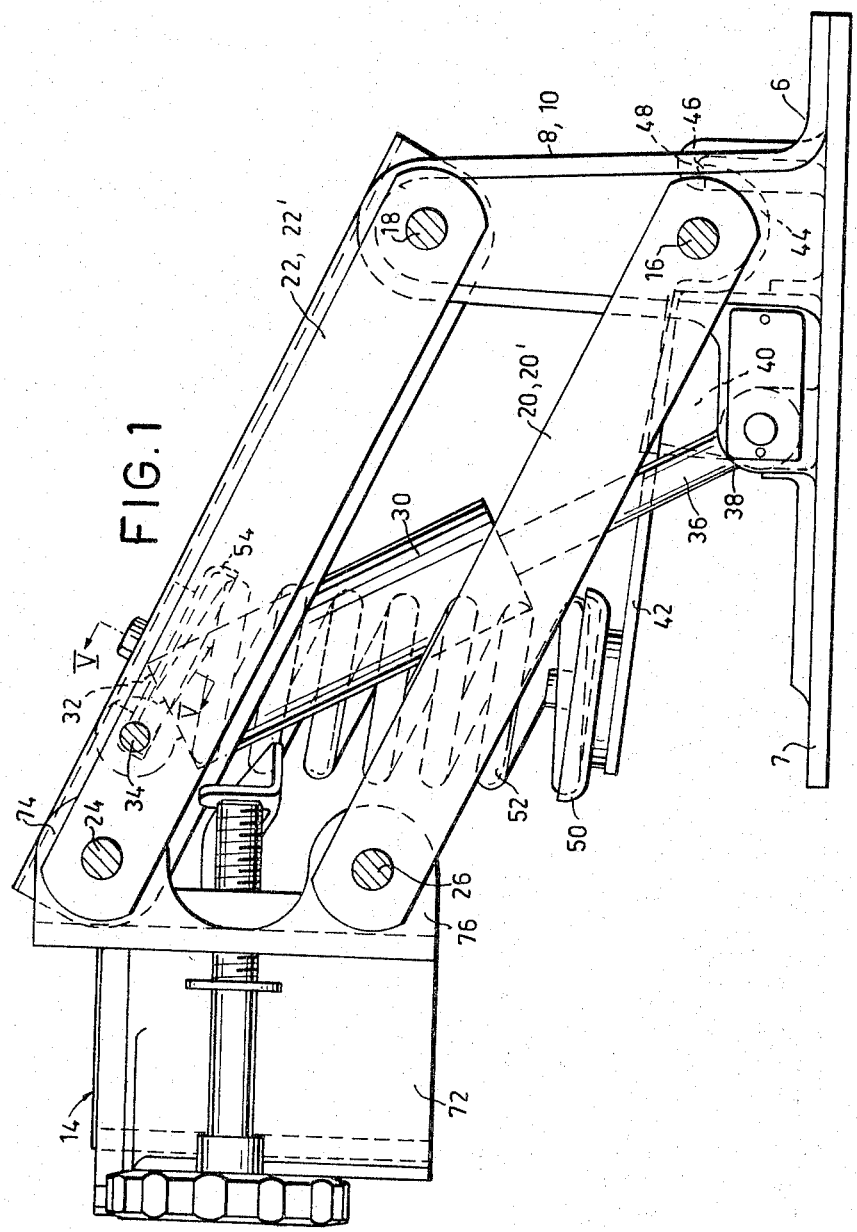

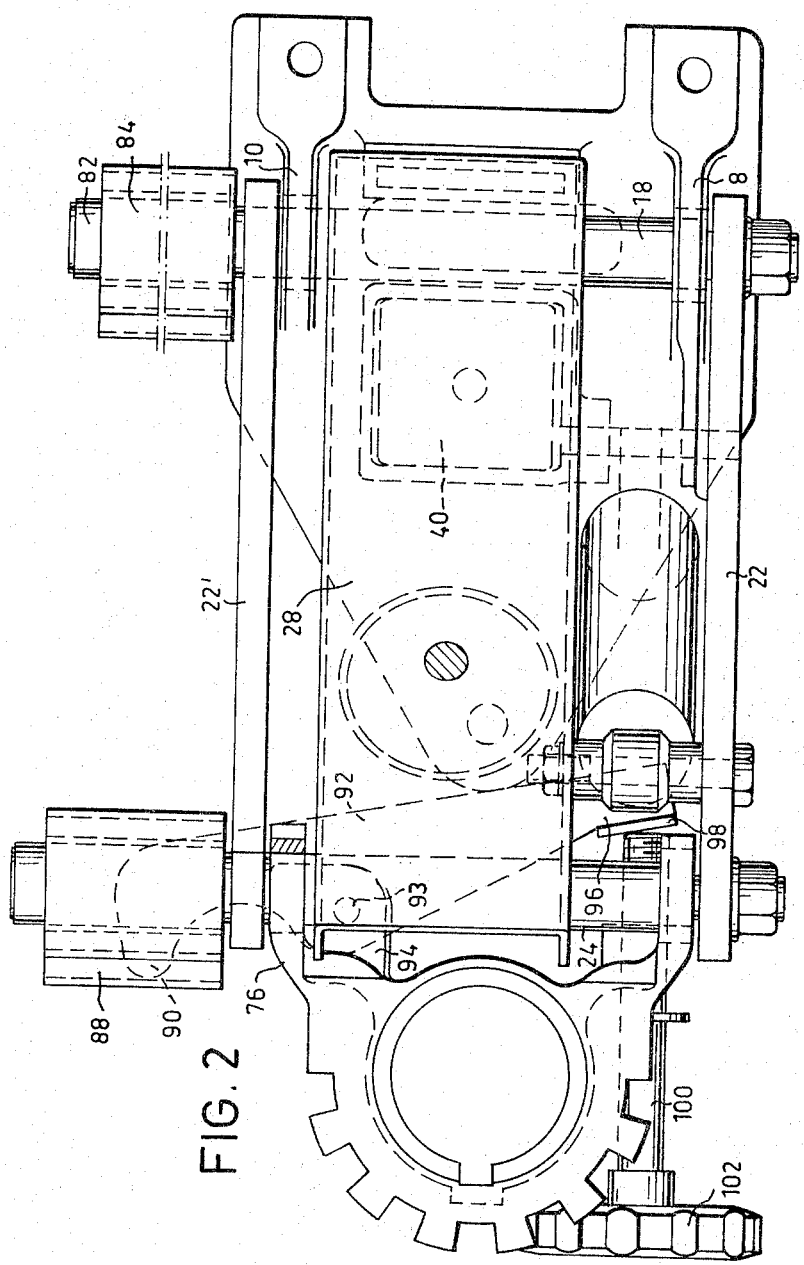

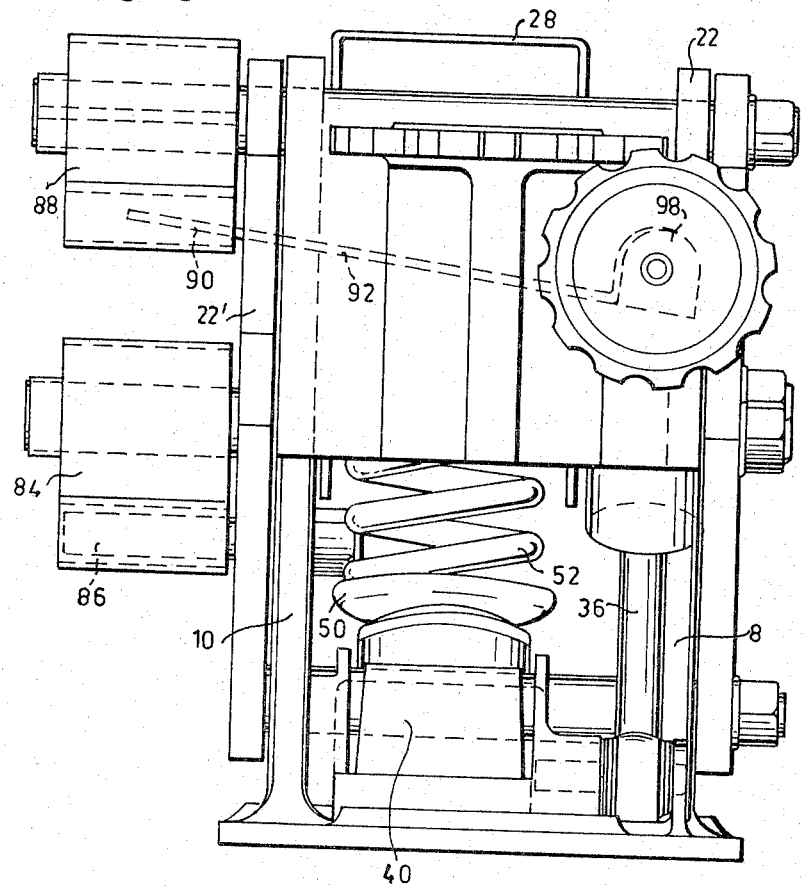

United States Patent Office 3,314,672  
Patented Apr. 18, 1967

3,314,672
RESILIENT SUPPORT FOR SEATS, ESPECIALLY FOR MOTOR VEHICLES
Bror Göte Persson, AB Be-Ge Karosserifabrik, Box 8, Oskarshamn, Sweden
Filed May 10, 1965, Ser. No. 454,564
13 Claims. (Cl. 267—1)

The present invention relates to a resilient support for seats of the kind used in motor vehicles, such as trucks.

When the vehicle is running on uneven roads the driver may be subjected to vertical acceleration of the order of 2 g which means that the force depressing the seat equals twice the weight of the driver. Consequently, a heavy driver exerts a considerably higher load on the spring device of the seat support than a lighter driver, resulting in a certain risk of the spring device striking the bottom. However, this risk can be avoided by the provision of a progressively acting spring device. The object of the invention is to provide a simple construction of such a spring device for seat supports of the kind referred to.

Another object of the present invention is the provision of a novel resilient support for a seat, especially for motor vehicles, comprising a parallelogram link system, coil spring means supporting said parallelogram link system, and leaf spring means supporting said coil spring means.

Still another object of the present invention is the provision of a novel resilient support for a seat, especially for motor vehicles, comprising a parallelogram link system between said seat and a base member, coil spring means elastically supporting said parallelogram link system and leaf spring means elastically supporting said coil spring means, and separate spring means operative at least at one point of said link system and further biasing said link system against movement of said support downwardly.

Another object of the invention is the provision of a novel resilient support for a seat, especially for motor vehicles, comprising a parallelogram link system between said seat and a base member, coil spring means elastically supporting said parallelogram link system and leaf spring means elastically supporting said coil spring means, and separate spring means operative at least at one point of said link system and further biasing said link system against movement of said support downwardly, a shock absorber being provided between said seat and said base member.

These and other objects will become more apparent from the following description and drawings. It is to be expressly understood, however, that the drawings are for the purpose of illustration only and are not definition of the limits of the invention, reference being made for this purpose to the appended claims.

In the drawings:

FIG. 1 is a side view of the resilient support according to the invention,

FIG. 2 is a top view of the support shown in FIG. 1,

FIG. 3 is an end elevation of the support shown in FIG. 1,

FIG. 4 is a diagrammatic view seen in the direction of the arrows IV—IV in FIG. 2 and showing the arrangement of the helical spring on the rear upper link shaft of the resilient seat support, FIG. 5 is a sectional view of the upper cradle for the coil spring, taken along the line V—V in FIG. 1, FIG. 6 is a diagrammatic side view of the resilient seat support together with the seat supported.

According to the figures a seat 2 with a back rest 4 is carried by a support 6 including two pillars 8, 10 extending from a base plate 7, said pillars carrying a parallelogram link system 12. The seat rests in a holder 14 carried by the parallelogram link system.

Extending through the two pillars 8, 10 and rotatably mounted in bearings therein are two parallel shafts 16, 18 located in the same vertical plane. The lower shaft 16 carries on its ends outside the pillars the ends of two links 20, 20' constituting a lower link pair of the parallelogram link system. The upper shaft 18 carries on its ends outside the pillars the ends of two links 22, 22' constituting an upper link pair in the parallelogram link system. These upper and lower link pairs each carries at their other ends a shaft 24, 26, respectively, parallel to the first shafts 16, 18. Rigidly connected at its ends the two shafts 24, 26 of the upper link pair is a U-shaped bridge 28 with its shanks directed downwardly and extending inside and in the same plane as these links 22, 22'.

The cylinder part 30 of a hydraulic or pneumatic shock absorber is at its upper closed end 32 rotatably carried by a screw 34 extending between one link 22 of the upper link pair and the adjacent shank of the bridge 28 and adjacent to the upper shaft 24 of said link pair. The lower end of a rod 36 secured to the plunger of the shock absorber is rotatably connected to a support 38 integral with the base plate 7 and situated in front of and inside the corresponding pillar 8. Under the bridge 28 and immediately in front of the pillars is a rubber bumper 40 secured to the base plate 7. Resting on this bumper 40 is a leaf spring 42, one end of said leaf spring extending through an approximately semi-circularly shaped curve 44 below the shaft 16. The upwardly pointing edge 46 of this curve abuts the lower surface of a hook-shaped stop 48 secured to the base plate 7 and extending along the width of the leaf spring 28. Resting in a cradle 50 against the other end of the leaf spring and ending immediately inside a vertical plane through the upper link shafts is the lower end of a coil spring 52 extending upwardly. The upper end of the coil spring 52 rests in a similar cradle 54 secured to the upper portion of the bridge 28 immediately below the pivot point 34 of the upper end 32 of the shock absorber. Each cradle consists according to FIG. 5 of a cup-shaped spring holder 56, a big rubber washer 58, a conical washer 60, a small rubber washer 62, a bushing 66, a screw 64 extending through these elements and secured by nuts 68 and 70 on each side of the holder 56, the upper cradle being secured to the bridge 28 in the way shown in FIG. 5 and the lower cradle to the spring 42 in the way shown in FIG. 1. These arrangements make sure that the end planes of the coil spring always assume a position parallel to the cup-shaped spring holders 56 irrespective of the inclination of the link arms against the horizontal plane.

The seat holder 14 comprising a cylindrical sleeve 72 carries at its upper and lower ends two pairs of perforated lugs 74, 76 and 78, 80, respectively. Extending through the upper lugs 74, 76 is the upper link shaft 24 and extending through the lower lugs 78, 80 is the lower shaft 26, said shafts being rotatable in said lugs.

Mounted on an extension 82 of the rear upper shaft 18 outside the corresponding link 22' is an easily removable spiral spring 84 which at its inner end is connected to the shaft 18 and at its outer end presses against a pin 86 secured to the pillar 10 below said spring 84 and counteracting rotation of the parallelogram link system downwardly. On the same side as the before mentioned spiral spring 84 the upper shaft 24 has an extension outside the link 22' provided with a similar spiral spring 88 being at its inner end secured to the shaft 24 and at its outer end presses against a cam projection 90 at one side of a lever 92 being rotatably connected at 93 to a projection 94 on the sleeve 72 adjacent to the lugs 76, 80. The other end 96 of the lever 92 extends towards the other side of the parallelogram link system and carries an upwardly extending integral stop face 98 against which the end of a screw 100 abuts. This screw 100 extends through a threaded hole in the seat holder 14 on the other side of which the screw carries a knob 102. By rotating this knob 102 the screw 100 by its abutment against the stop face 98 is able to rotate the lever 92 about its pivot 93 thereby changing the bias of the spring 84. Extending from the underside of the seat and through the sleeve 72 is a pivot, not shown, by means of which the seat is rotatable in a horizontal plane, preferably between determined limits, and the inclination of the seat back relatively to the seat being adjustable between determined limits. Due to the combination of the leaf spring 12 and the coil spring 52 a more resilient and progressively acting spring suspension of the parallelogram link system is achieved in that by making the coil spring more resilient than the leaf spring the excess of a load entirely compressing the coil spring will be elastically absorbed solely by the stronger leaf spring and the bumper 40 supporting said spring, thereby preventing any break down of the spring suspension as a whole. The leaf spring is easily exchangeable, whereby harder springs can be used for heavier drivers of the vehicle and conversely. The same is true for the spiral spring 84 as mentioned above.

While a single embodiment of the invention is herein illustrated and described, it will be understood that changes may be made in the construction and arrangement parts without departing from the spirit or scope of the invention.

Therefore, without limitation in this respect the invention is defined by the following claims.

What I claim is:

1. Resilient support means for a seat, especially for motor vehicles, comprising a parallelogram link system between said seat and a base member, coil spring means elastically supporting said parallelogram link system and leaf spring means elastically supporting said coil spring means, and separate spring means operative at least at one point of said link system and further biasing said link system against movement of said support downwardly.

2. Resilient support means for a seat, especially for motor vehicles, comprising a parallelogram link system between said seat and a base member, coil spring means elastically supporting said parallelogram link system and leaf spring means elastically supporting said coil spring means, and separate spring means operative at least at one point of said link system and further biasing said link system against movement of said support downwardly, a shock absorber being provided between said seat and said base member.

3. Resilient support for a seat, especially for motor vehicles, said support means comprising a holder for said seat, a parallelogram link system between said seat and a base member including at least two pairs of links, said pairs extending parallelly to each other in the same direction one above the other and said links in each pair being rigidly interconnected at adjacent ends by parallel shaft means, the adjacent shaft means at one end of said link system being rotatably connected to said seat holder and the adjacent shaft means at the other end of said link system being rotatably connected to said base member, coil spring means elastically supporting said parallelogram link system and leaf spring means elastically supporting said coil spring means, and separate spring means operative at least at one point of said link system and further biasing said link system against movement of said support downwardly, a shock absorber being provided between said seat and said base member.

4. Resilient support means for a seat according to claim 3, in which at least one of said separate spring means is a spiral spring means counteracting rotation of one of said shaft means in one direction.

5. Resilient support means for a seat according to claim 3, in which the torque of at least one of said spiral spring means is manually adjustable.

6. Resilient support means for a seat according to claim 5, in which the torque of at least one of said spiral spring means is manually adjustable by means of a screw means acting upon a lever operatively connected to said helical spring means.

7. Resilient support means for a seat according to claim 3, in which one end of said leaf spring means is fixed and the other end floatingly supports said coil spring means.

8. Resilient support means for a seat according to claim 7, in which said leaf spring means extends in approximately the same direction as said links below said parallelogram link system and said coil spring means extends upwardly from said leaf spring means and abuts said link system at its other end.

9. Resilient support for a seat, especially for motor vehicles, said support means comprising a holder for said seat, a parallelogram link system, a base supporting said parallelogram link system, said parallelogram link system including two pairs of links, each pair extending parallel to each other in the same direction one above the other and said links in each pair being joined at adjacent ends by parallel shaft means, the adjacent shaft means at one end of said link system being pivotably mounted above each other in pillars included in said base, the adjacent shaft means at the other end of said link system being held by said pair of links in a plane parallel to the plane of said first mentioned shaft means and pivotably connected to said holder, spiral spring means on at least one of said shaft means counteracting rotation of last-mentioned shaft means in one direction, coil spring means elastically supporting said parallelogram link system, leaf spring means elastically supporting said coil spring means, means holding one end of said spring means in said base member such that said leaf spring means counteracts downward movement of said seat, said leaf spring means extending in the same direction as said links below said link system, said coil spring means extending the other end of said leaf spring means and a point in said link system, a shock absorber being provided between said seat and said base.

10. Resilient support means for a seat according to claim 9, in which the torque of at least one of said spiral spring means is manually adjustable.

11. Resilient support means for a seat according to claim 10, in which the torque of at least one of said spiral spring means is manually adjustable by means of a screw means acting upon one arm of a double-armed lever, the other arm of said lever being operatively connected to said helical spring means.

12. Resilient support means for a seat according to claim 9, in which said holding means includes a bumper of a material such as rubber, plastics etc., elastically supporting said leaf spring.

13. Resilient support means for a seat according to claim 9, in which at least one end of said coil spring means rests in a cradle comprising a cup-shaped member supported on each side by spacers of a material such as rubber, plastics etc., a screw means holding said cup-shaped member and said spacers together and mounting them at said point in said link system and/or on said leaf spring.

References Cited by the Examiner

UNITED STATES PATENTS

| | | | |
|---|---|---|---|
| 979,827 | 11/1910 | Busch | 248—403 |
| 3,203,661 | 8/1965 | Brendel | 248—399 |
| 3,268,200 | 8/1966 | Eichor | 267—155 |

FOREIGN PATENTS 1,285,459  1/1962  France.

ARTHUR L. LA POINT, *Primary Examiner.*

R. M. WOHLFARTH, *Assistant Examiner.*